Dec. 26, 1922.                                                                                1,440,344
                                B. P. DONNELLY.
                             CURTAIN LIGHT MOUNTING.
                              FILED SEPT. 5, 1922.                      2 SHEETS-SHEET 1

Inventor
Bernard P. Donnelly
By Frank E. Liverance Jr.
Attorney.

Dec. 26, 1922.
B. P. DONNELLY.
CURTAIN LIGHT MOUNTING.
FILED SEPT. 5, 1922.

Inventor
Bernard P. Donnelly.
By Frank E. Liverance, Jr.
Attorney.

Patented Dec. 26, 1922.

1,440,344

UNITED STATES PATENT OFFICE.

BERNARD P. DONNELLY, OF HOLLAND, MICHIGAN, ASSIGNOR TO DUFFY MANUFACTURING CO., OF HOLLAND, MICHIGAN, A CORPORATION OF MICHIGAN.

CURTAIN-LIGHT MOUNTING.

Application filed September 5, 1922. Serial No. 586,070.

*To all whom it may concern:*

Be it known that I, BERNARD P. DONNELLY, a citizen of the United States of America, residing at Holland, in the county of Ottawa and State of Michigan, have invented certain new and useful Improvements in Curtain-Light Mountings; and I do hereby declare the following to be a full, clear, and exact description of the invention, such as will enable others skilled in the art to which it appertains to make and use the same.

This invention relates to a novel construction of glass mounting for the lights in curtains of tops for vehicles, particularly motor vehicles. It is a primary object and purpose of the present invention to make a mounting of this character wherein glass may be securely and permanently connected in an opening made therefor in the back curtain, the said back having a single fabric member as distinguished from those with double fabrics or, as it is known, a back fabric and a lining therefor. The invention is also adapted for use with other curtains beside the back curtain. A further object of the invention is to mount the glass in a frame formed as a single unitary structure molded from rubber, preferably, and in which the glass is installed in the frame in a very simple yet effective manner, being held from disengagement from the frame through the connection of the curtain thereto. A still further object is to make a mounting for the glass which is inherently capable of expanding under the force exerted by the back curtain as it shrinks, this permitting the curtain to be initially installed in a taut manner, yet will not result in a separation of the glass and its mounting by reason of the pull exerted by the curtain thereon. And a yet further object is to equip the mounting with a suitable reinforcement tending to aid in holding the mounting, on its longer sides, especially, from possibility of breaking away from the glass. All of these various objects and purposes, as well as many others not at this time particularly stated will appear, together with novel constructions for attaining the same, as understanding of the invention is had from the following description, taken in connection with the accompanying drawings, in which, Fig. 1 is a fragmentary perspective view of a motor vehicle top, showing a back curtain equipped with my invention.

Like reference characters refer to like parts in the several figures of the darwings.

The back curtain, indicated at 1, is of any suitable flexible material commonly used for this purpose, and in the same an opening is made for the glass 2 to be used, the opening being somewhat larger than the glass. While I have shown one glass mounted in the back curtain, it is evident that the number may be increased, and the sizes of the glass parts used varied at will.

Figure 1:
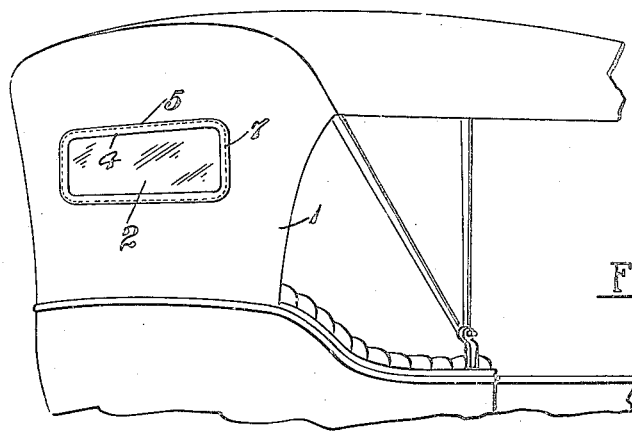
Figure 3:
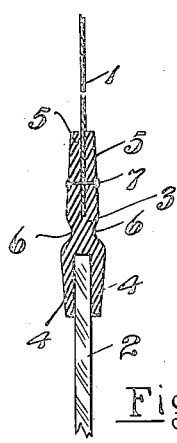
Fig. 3 is a cross section through the rubber frame or mount into which the glass is set.
Figure 4:
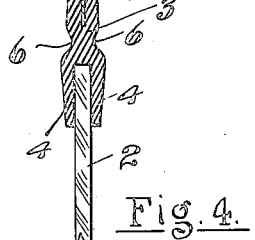
Fig. 4 is a vertical section enlarged and taken on the plane of line 4—4, of Fig. 2.
Figure 2:
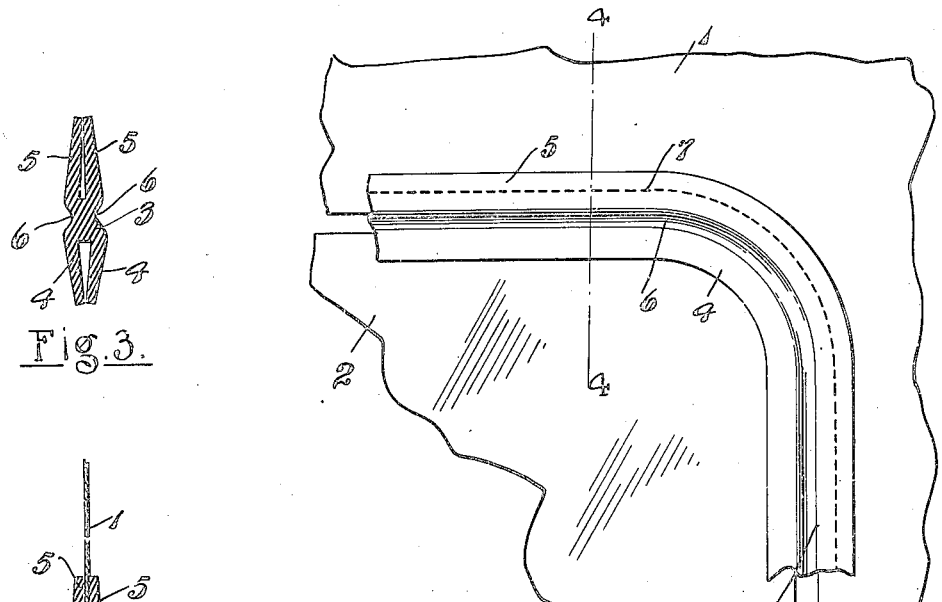
Fig. 2 is a fragmentary enlarged rear elevation of the back curtain top and glass mounted therein.
Figure 5:
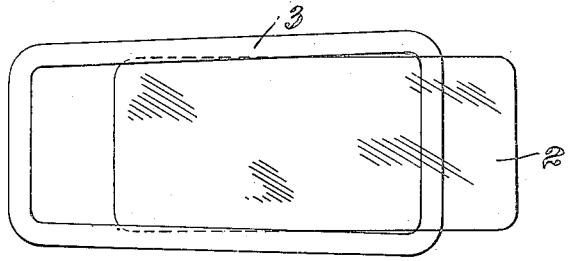
Fig. 5 is an elevation illustrating the manner of inserting the glass in the frame mount therefor.

The glass is designed to be mounted in and held by a frame, indicated as a whole at 3, preferably of rubber, of proper elasticity, sufficient that it can be placed over and around the glass. At its inner sides, two spaced apart flanges 4 are located and extend inwardly, the normal tendency of the flanges being to converge at their free ends. In the channel between said flanges the edge portions of the glass are received, it being evident that said flanges have a tendency to grip against the edges of the glass. A suitable cement for connecting glass and rubber may be used to make a permanent and secure connection between the glass and rubber. In Fig. 5, the insertion of the glass into the frame mount is illustrated, the frame stretching so that the glass may be readily inserted in place, afterward coming tightly against the glass at the edges thereof.

From the opposite side of the frame, two other flanges 5 extend outwardly, being but slightly spaced apart for the reception of the curtain material 1 at the edges of the opening made therein for the glass. Between the flanges 4 and 5, a connecting section is used, integrally formed with said flanges, and it is preferably recessed or grooved at both sides, as indicated at 6, thereby reducing the cross section and making a portion quickest to stretch on exertion of force in a direction outward from and in place of the glass. The curtain material 1 is permanently secured between the tongues 5 in any suitable manner, as by cementing, or by sewing the same through both of the tongues and the curtain, as shown at 7, or both may be used, there being a secure and permanent connection made. The curtain is liable to shrink, and usually at first installation of most types of curtain lights, the curtain is left quite loose with the expectation of its tightening from shrinkage after it gets out into service. With this invention, the curtain may be installed taut, any shrinkage being taken by the expansion permitted by the stretching of the rubber at the reduced portions between the grooves 6. In fact, this type of elastic expansible member is very desirable as a means of connection between the lower edge of the curtain and the body of the vehicle, for the above noted results coming therefrom.

Figure 6:
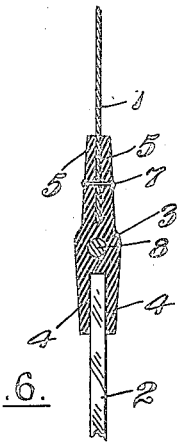
Fig. 6 is a section similar to that shown in Fig. 4, and illustrating a modification in structure wherein a metal reinforce is used in the frame.
Figure 7:
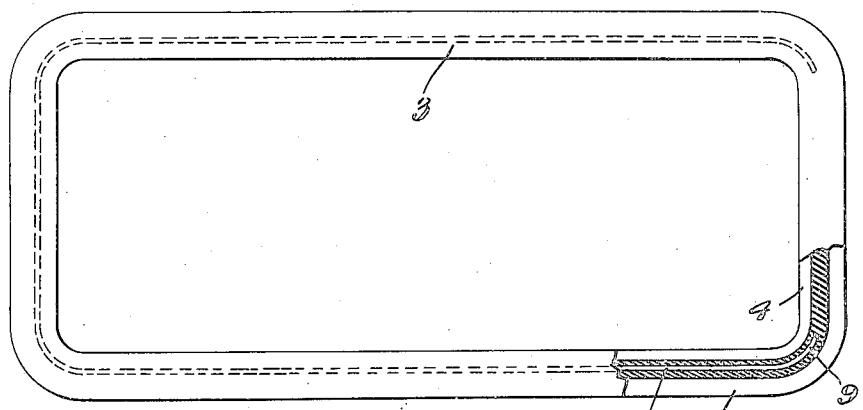
Fig. 7 is an enlarged elevation, with parts broken away and shown in section, illustrating the location of the metal reinforce in the frame.

In Figs. 6 and 7, I have shown a reinforcement for the glass mount, consisting in a wire or rod 8 which is moulded in the rubber between the tongues 4 and 5, extending along both the upper and lower longer sides and one end of the mount, and terminating at its ends in inwardly curved parts 9 which make a type of lock against the stretching of the unreinforced end of the mount after it is sewed in place, or otherwise secured to the curtain. This permits the insertion of the glass and stiffens the longer sides of the mount so that there will not be any liability of the said longer sides to stretch longitudinally and draw away from the glass at their middle portions. Also, as shown in Figure 6, it is clear that the frame is reduced in thickness outwardly beyond the reinforcing rod, making a portion more easily stretched than the thicker part where the rod is embedded so that on strain being imparted to the frame this reduced portion will yield at points outwardly beyond the location of the rod.

Figure 8:
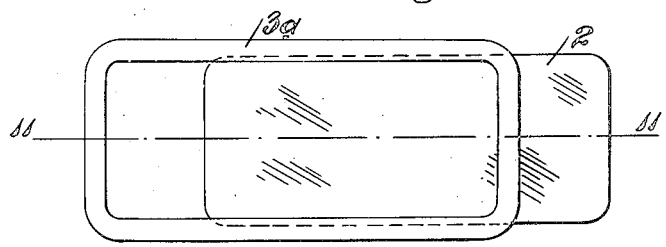
Fig. 8 is an elevation, similar to that shown in Fig. 5, illustrating the insertion of the glass through a centrally located vertical slit in one end of the frame mounting.
Figure 9:
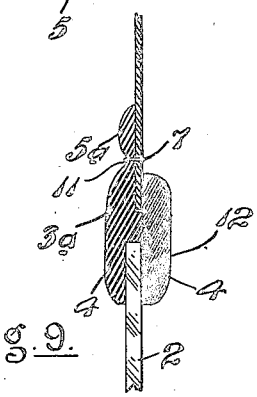
Fig. 9 is a section, similar to those shown in Figs. 4 and 6, illustrating the type of frame used in Fig. 8.
Figures 10, 11:
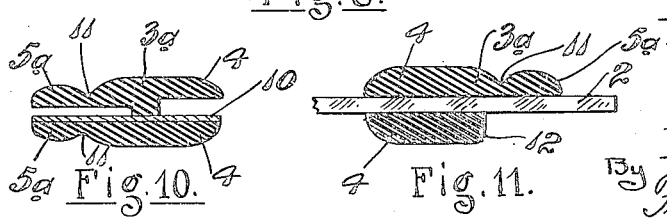
Fig. 10 is a cross section through a still further modified form of glass holding frame.
Fig. 11 is a section through the end of the frame mount, on line 11—11, of Fig. 8, showing the glass being passed through the vertical slit in one end of the frame mount.

Instead of the rod reinforce, an inelastic fabric 10 may be moulded in the rubber between the sides thereof and entirely around the same, permitting little or no stretch, as is obvious. This construction is shown in Fig. 10. Or, the frame mount may be made up of two parts of rubber vulcanized together, as shown in Figs. 9 and 11, one part consisting of a hard relatively inelastic rubber frame member 12, and the other a softer elastic rubber frame member $3^a$, from the latter of which a modified form of fabric attaching tongue $5^a$ extends with a groove 11 therein for defining the place for the sewing which connects the curtain to the tongue $5^a$. The same type of tongues may be used in the other forms, if desired, and as shown in Fig. 10. With either of the constructions, as shown in Figs. 10 and in Figs. 11 and 9, one end of the frame mount is left with a vertical slit for the insertion of the glass, in a manner similar to the insertion of a paper into the open end of an envelope. This is indicated in Figs. 8 and 11. Irrespective of the character of the reinforce used, this method of inserting the glass may be used, being simple and inexpensive, and when the curtain is secured, the slit is closed so as to hold the glass in place.

The constructions shown for glass mounting for use as rear curtain lights for vehicles are simple, inexpensive and particularly useful and practical. The glass with the rubber around it can be assembled at the factory and shipped to the user, being safeguarded against breakage from the cushioning effect of the rubber. The rubber also protects those having to handle the glass. The installation is very easy and particularly simple and practical. The expansion joint, so called, afforded by the stretching quality of the frame at the reduced portions thereof is very useful and practical. I have shown some of the different modifications which may be used without departing from the invention, and others will occur to those skilled in the art. Accordingly, the invention is not to be considered as limited to the specific disclosures made but is to be comprehensive of all forms of construction coming within the scope of the appended claims defining the invention.

I claim:

1. A construction of the class described, comprising a section of glass, a frame of rubber molded in a single piece surrounding the glass and formed at its inner side with two spaced apart flanges between which the edge portions of the glass is received, a reinforcing member embedded in the frame, a curtain having an opening therein for the reception of the frame, and means extending from the frame with which adjacent portions of the curtain around the opening are permanently connected, said curtain and reinforcing member lying substantially in the same plane.

2. A construction of the class described, comprising a section of glass, an endless rubber frame molded in a single piece surrounding the glass and clasping its edge portions, a reinforcing member embedded in and molded with the frame, said frame being reduced in thickness outwardly beyond the reinforcing member to provide a portion more easily stretched than the thicker portion of the frame where the reinforcing member is located, a curtain having an opening therein for the reception of the frame, and means for connecting the curtain to the frame with the curtain and reinforcing member lying in the same plane.

3. In a construction of the class described, an endless frame of rubber having an intermediate section from which two spaced apart flanges project inwardly and two spaced apart flanges project outwardly entirely around the same, said frame being slit between its front and rear sides for a part of its peripheral length for the passage of glass into the frame through said slit to between the inwardly extending flanges thereof, a curtain being adapted to be connected to the frame between the outwardly extending flanges and thereby close the slit after the glass is placed in the frame, substantially as and for the purposes described.

4. In a construction of the class described, an endless frame of rubber provided at its inner sides with glass receiving tongues between which the edges of the glass may be retained, said frame also at its outer sides having outwardly projecting means for attachment of a curtain thereto, said frame being slit between its front and rear sides for a part of its peripheral length for the passage of glass into the frame through said slit, glass located in the frame, and a curtain attached to said outwardly projecting means and connected thereto, said connection of the curtain closing the slit against removal of the glass from the frame, substantially as described.

In testimony whereof I affix my signature.

BERNARD P. DONNELLY.